US012698804B2

(12) United States Patent
Dirnberger et al.

(10) Patent No.: US 12,698,804 B2
(45) Date of Patent: Aug. 4, 2026

(54) PEDESTAL BEARING AND PRODUCTION PLANT WITH SUCH A PEDESTAL BEARING

(71) Applicant: Primetals Technologies Austria GmbH, Linz (AT)

(72) Inventors: Gregor Dirnberger, Enns (AT); Gerald Hohenbichler, Linz (AT); Johann Poeppl, Kirchschlag (AT); Franz Wimmer, Riedau (AT); Marvin Zemni, Steinhaus (AT)

(73) Assignee: Primetals Technologies Austria GmbH (AT)

( * ) Notice: Subject to any disclaimer, the term of this patent is extended or adjusted under 35 U.S.C. 154(b) by 186 days.

(21) Appl. No.: 18/696,996

(22) PCT Filed: Sep. 14, 2022

(86) PCT No.: PCT/EP2022/075534
§ 371 (c)(1),
(2) Date: Mar. 29, 2024

(87) PCT Pub. No.: WO2023/052129
PCT Pub. Date: Apr. 6, 2023

(65) Prior Publication Data
US 2024/0410426 A1 Dec. 12, 2024

(30) Foreign Application Priority Data
Sep. 29, 2021 (EP) ..................................... 21199895

(51) Int. Cl.
F16C 37/00 (2006.01)
F16C 33/58 (2006.01)
F16C 35/04 (2006.01)

(52) U.S. Cl.
CPC .......... F16C 37/007 (2013.01); F16C 33/586 (2013.01); F16C 35/042 (2013.01); *F16C 2322/00* (2013.01)

(58) Field of Classification Search
CPC ...... F16C 13/02; F16C 13/022; F16C 33/586; F16C 33/768; F16C 35/042; F16C 35/047;
(Continued)

(56) References Cited

U.S. PATENT DOCUMENTS 5,915,843 A * 6/1999 Mattera ................. F16C 37/007
384/321
7,597,481 B2 10/2009 Scherpf ......................... 384/470
(Continued)

FOREIGN PATENT DOCUMENTS

AT 521218 A1 11/2019
CA 952956 A * 8/1974
(Continued)

OTHER PUBLICATIONS

Machine Translation of CN-204200868-U (Year: 2015).*
(Continued)

*Primary Examiner* — Alan B Waits
(74) *Attorney, Agent, or Firm* — OSTROLENK FABER LLP

(57) ABSTRACT

A pedestal bearing that has a pedestal bearing housing with a bearing seat, a cooling duct system with at least one cooling duct, and an anti-friction bearing arranged in the bearing seat and has an anti-friction bearing outer ring. The bearing seat has a first inner circumferential side. The pedestal bearing housing has a first contact surface and is configured to transmit a bearing force (F) from the anti-friction bearing outer ring to the first contact surface. The cooling duct extends circumferentially and is configured to
(Continued)

conduct a coolant, which can be fed into the cooling duct in order to cool the anti-friction bearing and/or the pedestal bearing housing. The first inner circumferential side of the bearing seat of the pedestal bearing housing delimits the cooling duct radially on the outside and the anti-friction bearing outer ring delimits the cooling duct radially on the inside.

17 Claims, 8 Drawing Sheets

(58) Field of Classification Search
CPC ...... F16C 35/077; F16C 37/00; F16C 37/007; F16C 2322/00; F16C 2322/12; B22D 11/1287
See application file for complete search history.

(56) References Cited

U.S. PATENT DOCUMENTS

| | | | | |
|---|---|---|---|---|
| 8,616,778 | B2 | 12/2013 | Takahashi | |
| 12,071,983 | B2 | 8/2024 | Ito | |
| 2011/0142386 | A1* | 6/2011 | Flouros | F16C 33/586 384/321 |
| 2012/0328226 | A1* | 12/2012 | Gloeckner | F16C 37/007 384/476 |
| 2020/0269311 | A1* | 8/2020 | Banse | F16C 13/02 |

FOREIGN PATENT DOCUMENTS

| | | | | | |
|---|---|---|---|---|---|
| CN | 204200868 | U | * | 3/2015 | |
| CN | 107511466 | A | | 12/2017 | |
| CN | 110000354 | A | | 7/2019 | |
| EP | 3112061 | A1 | * | 1/2017 | .......... H02K 5/1732 |
| JP | S5612423 | U | | 9/1981 | |
| JP | 2010-261584 | A | | 11/2010 | |
| KR | 10-2014-0022171 | A | | 2/2014 | |
| KR | 2014-0022171 | A | | 2/2014 | |
| KR | 101420635 | B1 | | 2/2014 | |
| RU | 2363866 | C2 | | 8/2009 | |
| RU | 2372534 | C2 | | 11/2009 | |
| WO | WO 2011/117383 | A1 | | 9/2011 | |
| WO | WO 2021/053751 | A1 | | 3/2021 | |

OTHER PUBLICATIONS

International Search Report mailed Jan. 30, 2023 in corresponding PCT International Application No. PCT/EP2022/075534.
Decision of Grant dated Nov. 12, 2025 in corresponding Russian Patent Application No. 2024108095.

* cited by examiner

PEDESTAL BEARING AND PRODUCTION PLANT WITH SUCH A PEDESTAL BEARING

CROSS-REFERENCE TO RELATED APPLICATIONS

The present application is a 35 U.S.C. §§ 371 national stage application of International Application No. PCT/EP2022/075534, filed Sep. 14, 2022, which claims priority to European Patent Application No. 21199895.0, filed Sep. 29, 2021, the contents of which are incorporated herein by reference.

FIELD OF INVENTION

The invention relates to a pedestal bearing for mounting a slowly running body, in particular a roller, in a production plant, in particular a continuous casting plant, for producing a strand, as claimed, and to such a production plant as claimed.

BACKGROUND

A one-piece pedestal bearing having an undivided pedestal bearing housing is known from AT 521218 A1. The pedestal bearing housing has a bearing receptacle and a cooling duct system for a coolant. The pedestal bearing has a rolling bearing disposed in the pedestal bearing housing. The rolling bearing has a rolling bearing outer race, wherein the rolling bearing outer race is an integral constituent part of the pedestal bearing housing. The cooling duct system has a cooling duct, wherein the cooling duct is routed on the outside of the pedestal bearing housing and toward the outside is covered by a cover.

A guide roller device is known from KR 2014 0022171 A. The guide roller device has a plurality of pedestal bearings spaced apart from each other.

Various continuous casting roller sets are known from CN 107 511 466 A, CN 110 000 354 A and WO 2011/117383 A1.

SUMMARY OF CLAIMED INVENTION

It is an object of the invention to provide an improved pedestal bearing, in particular an improved cooled pedestal bearing, and an improved production plant with such a pedestal bearing.

This object is achieved by means of a pedestal bearing as claimed, and by a production plant as claimed. Advantageous embodiments are set forth in the dependent claims.

It has been recognized that an improved pedestal bearing for mounting a slowly running body in a production plant, in particular a continuous casting or a casting-rolling composite plant, for the production of a strand, or a hot-rolled material, can be provided in that the pedestal bearing has a pedestal bearing housing with a bearing receptacle, a cooling duct system with at least one cooling duct, and a rolling bearing which is disposed in the bearing receptacle and has a rolling bearing outer race. The bearing receptacle has a first inner circumferential side encircling the rotation axis, wherein the pedestal bearing housing has a first contact face, wherein the pedestal bearing housing is designed to transfer a bearing force from the rolling bearing outer race to the first contact face. The first inner circumferential side of the bearing receptacle of the pedestal bearing housing delimits the cooling duct radially outside. Furthermore, the rolling bearing outer race delimits the cooling duct radially inside, wherein the cooling duct extends in the circumferential direction about the rotation axis and is designed to guide a coolant which able to be fed into the cooling duct for cooling the rolling bearing and/or the pedestal bearing housing.

This design embodiment has the advantage that the pedestal bearing is of a particularly simple configuration. Furthermore, the cooling duct is disposed particularly close to the rolling bearing outer race, so that a lubricant of the rolling bearing is cooled particularly well as a result. As a result, overheating of the lubricant of the rolling bearing can be avoided when using the pedestal bearing in the production plant for the production of the hot-rolled material, in particular a slab strand. In particular, overheating of the lubricant above a critical temperature and thus thermal decomposition of the lubricant is avoided.

The rolling bearing outer race can be connected to the pedestal bearing housing in a rotationally fixed manner; it would also be possible that the rolling bearing outer race is rotatable relative to the pedestal bearing housing, for example rotatable over a small angular range of up to 30°. In particular, the connection between the rolling bearing outer race and the pedestal bearing can be selected in such a way that conjoint travel of the rolling bearing outer race over the running time of the pedestal bearing is possible.

In a further embodiment, the rolling bearing outer race on a second outer circumferential side has a groove channel which is designed to be groove-shaped at least in portions and extends in the circumferential direction. The groove channel is designed to be radially outwardly open, and radially inwardly delimits the cooling duct. This design embodiment has the advantage that the groove channel can be incorporated into the rolling bearing outer race particularly easily by means of a milling process.

In a further embodiment, the pedestal bearing housing on the first inner circumferential side has a groove channel which is designed to be groove-shaped at least in portions and extends in the circumferential direction. The groove channel is designed to be radially inwardly open, and radially outwardly delimits the cooling duct. This design embodiment has the advantage that the groove channel can be produced conjointly, for example, when casting the pedestal bearing housing. Alternatively, the groove channel can also be cost-effectively incorporated into the first inner circumferential side by means of a milling operation.

It is particularly advantageous for the groove channel to be at least in portions designed to be meandering or annular between a first end side of the rolling bearing outer race and a second end side of the rolling bearing outer race that is opposite in the axial direction. As a result, particularly good heat absorption from the rolling bearing outer race can be provided by the coolant, so that particularly good cooling of the rolling bearing is ensured.

In a further embodiment, the groove channel has a first groove channel portion and a second groove channel portion fluidically connected to the first groove channel portion. The first groove channel portion extends in the circumferential direction about the rotation axis. The second groove channel portion extends in the circumferential direction about the rotation axis so as to be axially offset from the first groove channel portion. The rolling bearing outer race axially between the first groove channel portion and the second groove channel portion has a web. The web rests against the first inner circumferential side of the bearing support. This design embodiment has the advantage that the rolling bearing outer race is supported particularly well in the bearing receptacle.

In a further embodiment, the groove channel has a third groove channel portion, wherein the first groove channel portion extends in the circumferential direction parallel to the second groove channel portion. The third groove channel portion connects a circumferential end of the first groove channel portion to the second groove channel portion. This design embodiment has the advantage that the rolling bearing outer race is cooled particularly well over a large axial width by the coolant guided in the two groove channel portions.

In a further embodiment, the cooling duct extends over a predefined first angular segment about the rotation axis. A supporting region cooling adjoins the duct in the circumferential direction. The supporting region extends over a predefined second angular segment, wherein the second angular segment is smaller than the first angular segment. The supporting region is designed to support a bearing force from the rolling bearing on the pedestal bearing housing. Preferably, the first inner circumferential side and the second outer circumferential side in the supporting region rest against one another across substantially the entire area. As a result, a low surface pressure is achieved even at a high bearing force in the supporting region, so that any unwanted deformation, for example a (local) flow of a material of the rolling bearing outer race or the pedestal bearing housing can be reliably avoided. Advantageously, the bearing force is able to be transmitted predominantly via the supporting region to the pedestal bearing housing, wherein the bearing force is directed so as to proceed from the rotation axis to the supporting region during a majority of the operating time (in excess of 90 percent of the operating time). This design embodiment has the advantage that the bearing force is supported substantially by the supporting region and by the remaining region in which the cooling duct runs, thus avoiding damage to the web, for example.

In a further embodiment, the first angular segment includes an angle of at least 140° to 330°, both inclusive, in particular from at least 180° to 300°, both inclusive, about the rotation axis. This ensures reliable cooling of the rolling bearing.

It is particularly advantageous for the rolling bearing outer race to be designed in one piece and in a materially integral manner. As a result, the rolling bearing can be produced in a particularly cost-effective manner, and there are particularly few assembly steps for assembling the pedestal bearing.

In a further embodiment, the rolling bearing outer race has an intermediate ring and a bearing ring, wherein the intermediate ring is formed so as to be hollow-cylindrical about the rotation axis and radially inside has a fifth inner circumferential side and radially outside has the second outer circumferential side. The bearing ring is disposed radially inside the intermediate ring and is radially outside the fifth inner circumferential side of the bearing ring. The two-part design of the rolling bearing outer race has the advantage that the intermediate ring can be produced in a particularly simple and cost-effective manner in the context of a turning process, for example from a tempered steel, and a complex surface treatment, in particular hardening of the surfaces on the intermediate ring, can be dispensed with.

In a further embodiment, the intermediate ring has the groove channel extending radially from the second outer circumferential side in the direction of the fifth inner circumferential side. This design embodiment has the advantage that it is possible to dispense with the incorporation of the groove channel into the bearing ring, the latter being hardened, for example.

In a further embodiment, the pedestal bearing has a fifth sealing element and a first sealing groove disposed on the second outer circumferential side, wherein the first sealing groove is designed to completely encircle the rotation axis on the second outer circumferential side. The fifth sealing element is at least in portions disposed in the first sealing groove. The fifth sealing element rests against the first inner circumferential side and lies in the first sealing groove so as to rest against the latter, and seals the cooling duct in a fluid-tight manner. It can be avoided as a result that the lubricant and the coolant mix, the former being oil-based or grease-based, and the latter being water-based. This ensures reliable lubrication and prevents corrosion of the rolling bearing.

In a further embodiment, the first sealing groove and the groove channel are formed on the first inner circumferential side or in the second outer circumferential side. As a result, the machining complexity is low, as the first sealing groove and the groove channel can be produced in short succession or simultaneously in one machine.

In a further embodiment, the cooling duct system has a feed duct disposed in the pedestal bearing housing and a return duct disposed in the pedestal bearing housing, wherein the feed duct and the return duct each open into the cooling duct in a mutually offset manner, wherein the coolant is able to be fed into the cooling duct by means of the feed duct, wherein the coolant is able to be discharged from the cooling duct by means of the return duct. As a result, a simple connection to a coolant circuit can be provided.

The production plant, which is in particular a cast-rolling composite plant, is designed for producing and/or transporting a hot-rolled material, in particular a hot-cast slab strand. The production plant has a pedestal bearing and a roller with a roller surface disposed on the circumference for guiding, supporting and/or forming the hot-rolled material. The rolling bearing supports the roller so as to be rotatable about the rotation axis. This design embodiment has the advantage that overheating of the rolling bearing is prevented due to the cooling being close to the rolling bearing, the roller being in particular able to transport the hot-rolled material at a slow running speed.

BRIEF DESCRIPTION OF THE FIGURES

The invention will be explained in more detail hereunder by means of figures, in which:

FIG. 12a shows a sectional view along the section plane G-G, shown in FIG. 10, through the pedestal bearing in a partially assembled condition;

FIG. 12b shows a perspective illustration of the pedestal bearing shown in FIG. 12a;

FIG. 13a shows a perspective illustration of a rolling bearing of a pedestal bearing according to a second embodiment;

FIG. 13b and FIG. 13c each show a lateral view of the rolling bearing shown in FIG. 13a from different directions;

DETAILED DESCRIPTION

Figure 1:
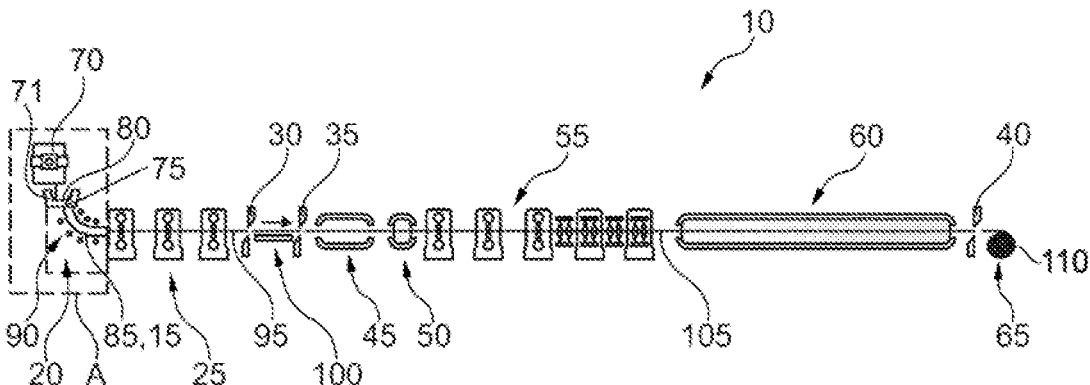
FIG. 1 shows a schematic illustration of a production plant for the production of a hot-rolled material.

FIG. 1 shows a schematic illustration of a production plant 10 for producing a hot-rolled material 15.

The production plant 10 by way of example is designed as a cast-rolling composite plant. The production plant 10 has, for example, a continuous casting machine 20, a pre-rolling train 25, a first to third separating device 30, 35, 40, an intermediate heater 45, preferably a descaler 50, a finishing rolling train 55, a cooling section 60, a coiling device 65 and a strand guide 90.

The continuous casting machine 20 by way of example is designed as an arc continuous casting machine. The continuous casting machine 20 has a ladle 70, a distributor 71, and a mold 75. In operation of the production plant 10, the distributor 71 is filled with a metallic melt 80 by means of the ladle 70. The metallic melt 80 can be produced, for example, by means of a converter by a Linz-Donawitz method. The metallic melt 80 may comprise steel, for example. In the continuous casting machine 20, the metallic melt 80 is cast so as to form a partially solidified slab strand 85, in particular a thin slab strand. The partially solidified slab strand 85 is pulled out of the mold 75 and deflected in an arcuate manner into a horizontal plane and supported by the strand guide 90, and solidifies. The slab strand 85 is conveyed away from the mold 75 in the conveying direction.

It is particularly advantageous for the continuous casting machine 20 to cast the slab strand 85 in an endless strand. The pre-rolling train 25 is downstream of the continuous casting machine 20 in a conveying direction of the slab strand 85. In the embodiment, the pre-rolling train 25 follows directly the continuous casting machine 20. The pre-rolling train 25 can roll the slab strand 85 to a pre-rolling strip 95 by means of one or more pre-rolling stands.

The first and second separating device 30, 35 are downstream of the pre-rolling train 25 in terms of the conveying direction of the pre-rolling strip 95. For transporting the pre-rolling strip 95 between the descaler 50 and the pre-rolling train 25, a roller table 100 of the strand guide 90 can be disposed between the pre-rolling train 25 and the descaler 50, for example. The pre-rolling strip 95 is guided by means of the roller table 100 through the first and second separating device 30, 35 to the descaler 50. In the intermediate heater 45, the pre-rolling strip 95 is heated, for example to a temperature between 850° C. and 1050° C., before the pre-rolling strip is passed through the descaler 50. In the descaler 50, the pre-rolling strip 95 is descaled and subsequently fed to the finishing rolling train 55. In the finishing rolling train 55, the pre-rolling strip 95 is finished from 25 to 65 mm down to a finished rolled strip 105, for example. The finished rolled strip 105 can have a material thickness of 0.8 to 20 mm. The finished rolled strip 105 is fed from the finishing rolling train 55 into the cooling line 60, and is cooled down to a temperature below 450° C. in the cooling line 60 by the strand guide 90. After passing through the third separating device 40, the finished rolled strip 105 is wound so as to form a coil 110 by means of the coiling device 65. When the coil 110 is fully wound, the third separating device 40 separates the finished rolled strip 105.

The production plant 10 may also be reduced to the continuous casting line, wherein the continuous casting line by means of the continuous casting machine produces a slab strand as hot-rolled material 15 from the liquid metallic melt 80.

Figure 2:
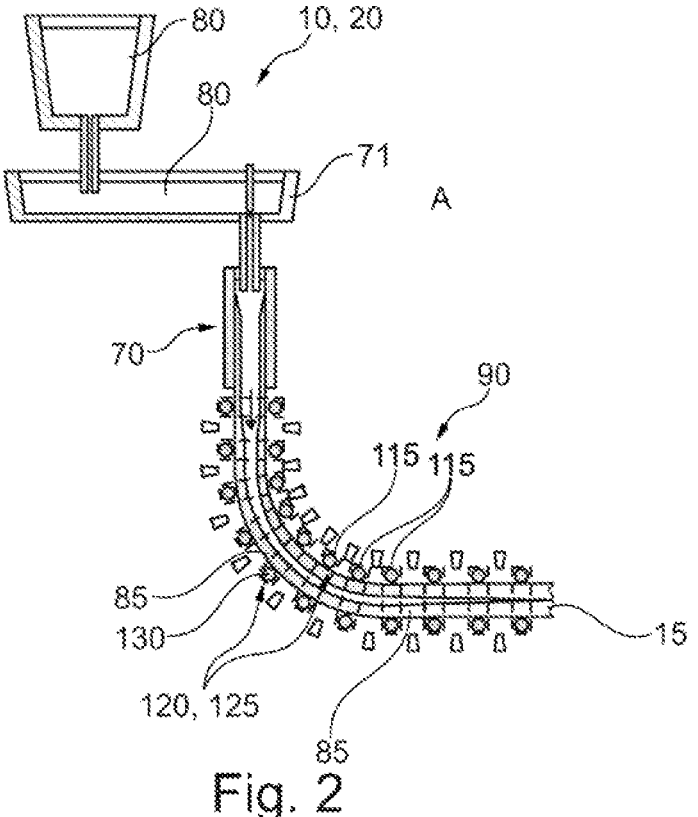
FIG. 2 shows a schematic illustration of a fragment A of the production plant, marked in FIG. 1.

FIG. 2 shows a schematic illustration of a fragment A of the production plant 10, marked in FIG. 1.

The strand guide 90 has one or a plurality of driving stands 115 which are disposed so as to be mutually offset in terms of the conveying direction of the slab strand 85. Each of the driving stands 115 has at least one roller 120 and a pedestal bearing 125, wherein the pedestal bearing 125 mounts the respective assigned roller 120 so as to be rotatable about a rotation axis 130. Preferably, the driving stand 115 has a pair of rollers consisting of two rollers 120 which are disposed opposite one another and are in each case mounted so as to be rotatable about the rotation axis 130 by an associated pedestal bearing 125, in particular by an arrangement of a plurality of pedestal bearings 125 that are disposed so to be mutually offset in the axial direction along the rotation axis 130.

Both the roller 120 and the pedestal bearing 125 are exposed to high thermal stress in the strand guide 90 of the slab strand 85, the latter being only partially solidified in the strand guide 90. The slab strand 85 has a temperature between 900° C. and 1200° C. in the strand guide 90 and heats the roller 120 and the pedestal bearing 125 by its heat. Furthermore, a rotating speed of the roller 120 is low, so that the roller 120 is thermally highly stressed by the physical contact. A rotating speed of the roller 120 herein is between 0.2 and 5 revolutions per minute.

Figure 3:
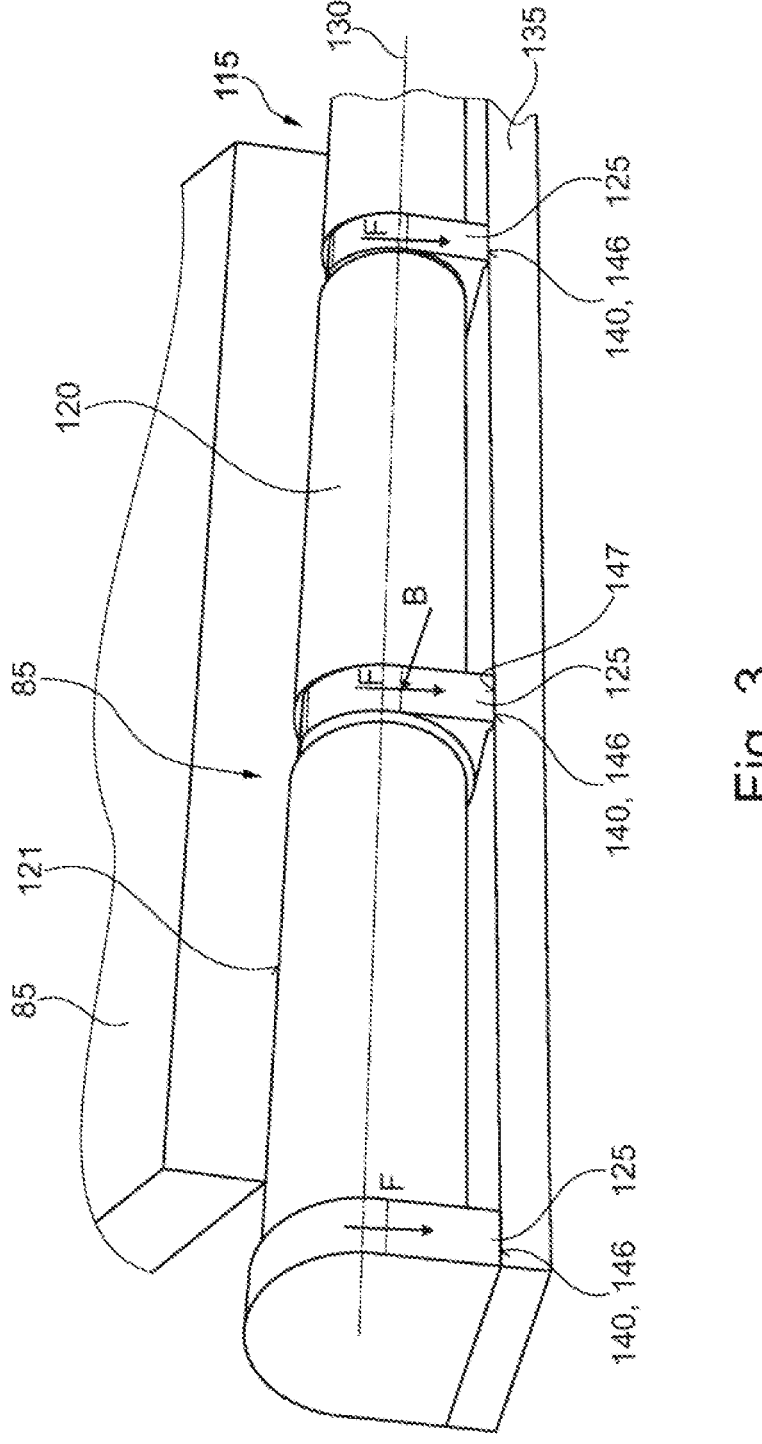
FIG. 3 shows a schematic perspective illustration of a fragment of a strand guide of the production plant shown in FIG. 2.

FIG. 3 shows a schematic perspective illustration of a fragment of the strand guide 90.

In the embodiment, the roller 120 is disposed on a plurality of pedestal bearings 125 that are disposed so as to be mutually offset in terms of the axial direction with respect to the rotation axis. The roller 120 has a rolling surface 121 on the circumferential side. Each of the pedestal bearings 125 is penetrated by the roller 120 and by means of the rolling surface 121 supports at least one bearing force F resulting from guiding, deflecting and/or reducing the cross section of the slab strand 85 via the pedestal bearing 15 on a segment frame 135 of the driving stand 115. The segment frame 135 disposed in such a manner, for example, that the bearing force F is disposed so as to be substantially perpendicular to a fastening side 140 of the pedestal bearing 125. The fastening side 140 here is disposed on that side of the pedestal bearing 125 that faces away from the slab strand 85.

Figure 4:
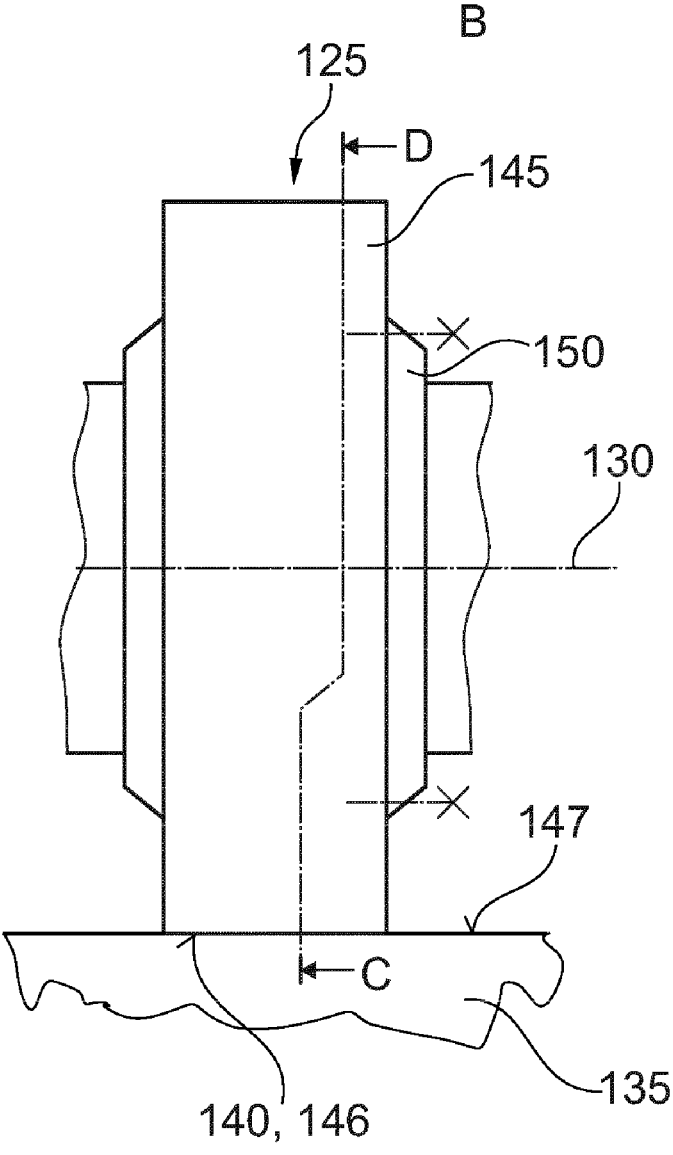
FIG. 4 shows a lateral view of a view of a pedestal bearing of the production plant in a direction B, marked in FIG. 3.

FIG. 4 shows a lateral view of the pedestal bearing 125 in a viewing direction B, marked in FIG. 3, onto the pedestal bearing 125.

The pedestal bearing 125 has, for example, a pedestal bearing housing 145 and a first housing cover 150. The pedestal bearing housing 145 has a first contact face 146 which forms the fastening side 140. At the first contact face 146, the pedestal bearing housing 145 can rest against a second contact face 147 of the segment frame 135 and preferably be fastened thereto, for example, by means of a screw connection. The first contact face 146 and/or the second contact face 147 can be designed to be planar and extend parallel to the rotation axis 130.

At the end side, the first housing cover 150 is preferably fastened to the pedestal bearing housing 145 in a reversibly releasable manner. The pedestal bearing housing 145 can be cast, or flame-cut from a steel block, for example. In particular, the pedestal bearing housing 145 can be designed in one piece and in a materially integral manner.

Figure 5:
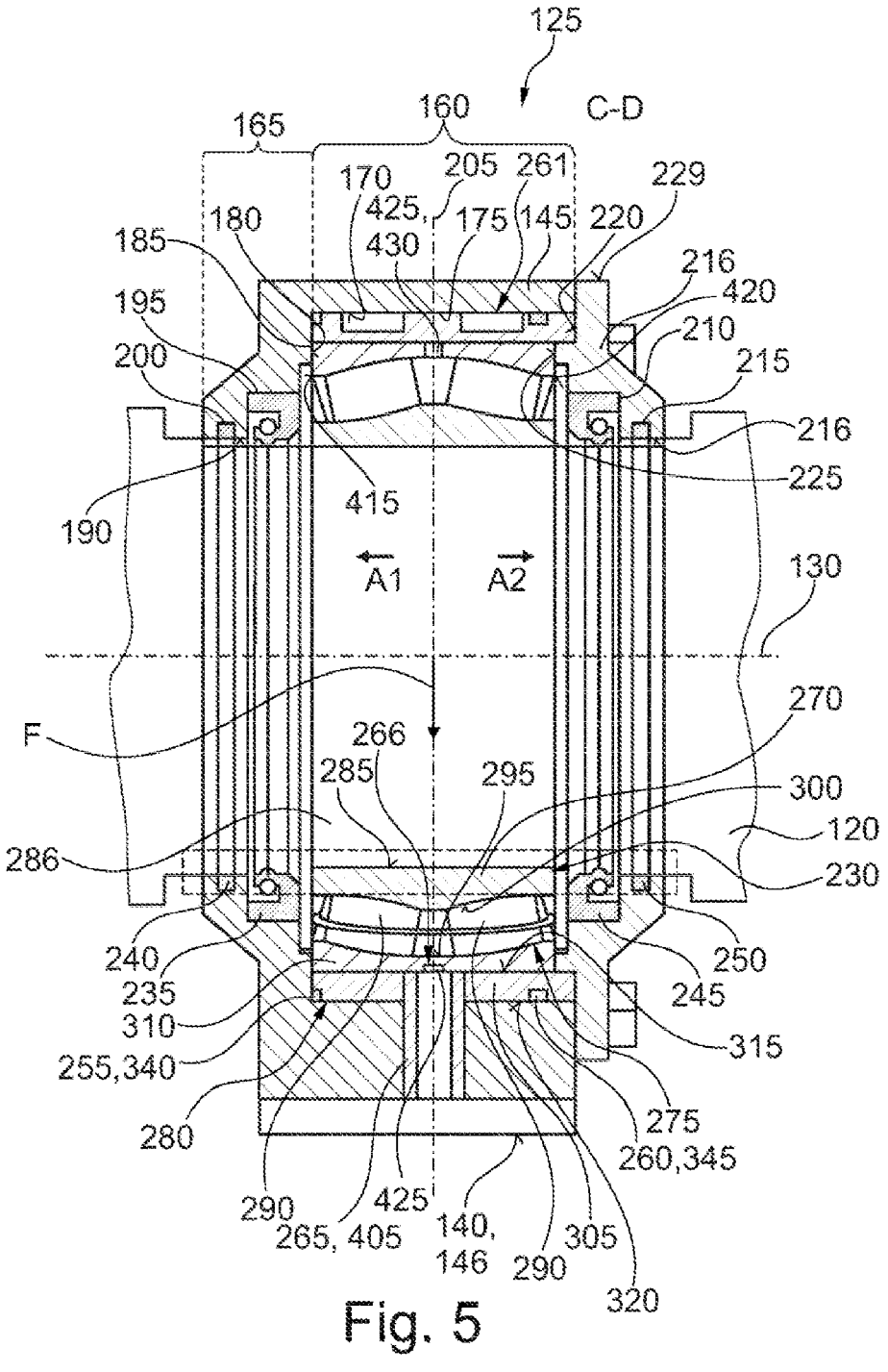
FIG. 5 shows a sectional view along a section profile C-D, shown in FIG. 4, through the pedestal bearing of the production plant shown in FIG. 4.

FIG. 5 shows a sectional view along a section profile C-D, shown in FIG. 4, through the pedestal bearing 125 of the production plant 10 shown in FIG. 4.

The pedestal bearing housing 145 has a bearing portion 160 and a cover portion 165, wherein the cover portion 165 is connected to the bearing portion 160 in a first axial direction A1 in terms of the rotation axis 130. The cover portion 165 is disposed axially on an axial side of the bearing portion 160 that faces away from the first housing cover 150.

The bearing portion 160 has a bearing receptacle 175. The bearing receptacle 175 has a first inner circumferential side 170 which radially outwardly delimits the bearing receptacle 175. The first inner circumferential side 170 is designed to completely encircle the rotation axis 130. The bearing receptacle 175 is formed in a radial direction, for example, in a cylindrical form about the rotation axis 130. In the embodiment, in the circumferential direction the first inner circumferential side 170 is designed to be substantially, preferably to a degree of at least 80% of a total area of the first inner circumferential side 170, without interruptions in the circumferential direction. The bearing receptacle 175 in the pedestal bearing housing 145 can be produced by means of turning or milling, for example.

The cover portion 165 extends away from the bearing portion 160 in the axial direction. Furthermore, the cover portion 165 is routed diagonally inward in the radial direction. The cover portion 165 is preferably designed in stages and delimits the bearing receptacle 175 by way of a first shoulder face 180 of a shoulder 185 in the first axial direction A1. The first shoulder face 180 preferably extends in a rotational plane perpendicular to the rotational axis 130.

Provided in the cover portion 165 on a second inner circumferential side 190 is a first seal receptacle 195 and a second seal receptacle 200 which is disposed so as to be axially offset from the first seal receptacle 195 in the first axial direction A1. In the axial direction, the first seal receptacle 195 is disposed between the bearing receptacle 175 and the second seal receptacle 200.

The first housing cover 150 is designed to be substantially mirror-symmetrical to the cover portion 165 in terms of a symmetry plane 205 which is aligned perpendicular to the rotation axis 130 and is designed approximately in the central position in terms of a maximum extent of the bearing receptacle 175. The cover portion 165 has a third seal receptacle 210 and a fourth seal receptacle 215 on a third inner circumferential side 216. The fourth seal receptacle 215 is disposed axially on a side that faces away from the bearing receptacle 175 in a second axial direction A2 the latter extending opposite to the first axial direction A1, in relation to the third seal receptacle 210.

The first housing cover 150 is fastened to the pedestal bearing housing 145 in a reversibly releasable manner so as to be axially opposite the cover portion 165 on the bearing portion 160, and protrudes radially inward beyond the first inner circumferential side 170 of the bearing receptacle 175.

The first housing cover 150 is designed to be stepped on the end side on that axial side that faces the bearing portion 160, and has a second shoulder face 220 and preferably a third shoulder face 225. The second shoulder face 220 adjoins a first outer circumferential side 229 of the first housing cover 150 in the radial direction. The second shoulder face 220 and the third shoulder face 225 are disposed on that end face of the first housing cover 150 that faces the bearing receptacle 175. The second shoulder face 220 is disposed so as to be recessed from the third shoulder face 225 in such a way that an axial spacing between the first shoulder face 180 and the second shoulder face 220 is larger than between the first shoulder face 180 and the third shoulder face 225. The third shoulder face 225 adjoins the second shoulder face 220 inwards in the radial direction. The second shoulder face 220 and the third shoulder face 225 delimit the bearing receptacle 175 in the axial direction A2.

The pedestal bearing 125 furthermore has a rolling bearing 230, preferably a first to sixth sealing element 235, 240, 245, 250, 255, 260, and a cooling duct system 261. Additionally, the pedestal bearing may have a securing means 265 and/or a lubrication duct system 266. The first and third sealing element 235, 245 by way of example are designed as a shaft sealing ring. The second, fourth to sixth sealing element 240, 250, 255, 260 are designed, for example, as a sealing ring having a circular or rectangular cross-section. For example, the first sealing element 235 is disposed in the first seal receptacle 195, and the second sealing element 240 is disposed in the second seal receptacle 200, of the cover portion 165. As a result, the bearing receptacle 175 is sealed multiple times in the first axial direction A1 and protected against the ingress of corrosive media, in particular cooling water for cooling the slab strand 85.

The third sealing element 245 is disposed in the third seal receptacle 210, and the fourth sealing element 250 is disposed in the fourth seal receptacle 215, so that the bearing receptacle 175 is protected from the ingress of corrosive media, for example, the cooling water for cooling the slab strand 85, in the second axial direction A2 as well.

The rolling bearing 230 has a rolling bearing inner race 270, a rolling element assembly 275, having at least one rolling element 290, and a rolling bearing outer race 280. The rolling bearing inner race 270 by way of a fourth inner circumferential side 285 rests against a bearing portion 286 of the roller 120. The bearing force F from the bearing portion 286 of the roller 120 is transmitted via the fourth inner circumferential side 285 into the rolling bearing inner race 270.

The rolling bearing inner race 270 is disposed radially inside the rolling element assembly 275. The rolling element assembly 275 may comprise a plurality of rolling elements 290, which are designed so as to be, for example, barrel-shaped, conical or spherical. The rolling bearing outer race 280 is disposed radially outside the rolling element assembly 275. The rolling bearing outer race 280 has a first raceway 295 radially on the inside. The rolling bearing inner race 270 has a second raceway 300 radially on the outside, wherein the rolling element assembly 275 is arranged between the first raceway 295 and the second raceway 300. The rolling element 290 rolls on the first and the second raceway 295, 300. The bearing force F is transmitted from the rolling bearing inner race 270 via the rolling element assembly 275 to the rolling bearing outer race 280

In the embodiment, the rolling bearing outer race 280 is designed in two parts, for example. In this instance, rolling bearing outer race 280 has an intermediate ring 305 and a bearing ring 310, wherein the bearing ring 310 has the first raceway 295 and is disposed radially inside the intermediate ring 305. The intermediate ring 305 encompasses the bearing ring 310 and rests radially against the outside of the bearing ring 310. In particular, the intermediate ring 305 can be shrunk onto the bearing ring 310. The intermediate ring 305 may comprise a tempered steel, for example.

The rolling bearing 230 has a first end side 415 and a second end side 420 disposed axially opposite the first end side 415. The first end side 415 rests against the first shoulder face 180. The second end side 420 by way of example is designed to be stepped above the intermediate ring 305 and the bearing ring 310. In this instance, the second end side 420 of the intermediate ring 305 rests against the second shoulder face 220, and the second end side 420 of the bearing ring 310 rests against the third shoulder face 225. As a result, the rolling bearing outer race 280 is fixedly established in the axial direction in both axial directions A1, A2.

By way of example, the bearing ring 310 is designed to be shorter than the intermediate ring 305 in the axial direction, so that, as shown in FIG. 5, the intermediate ring 305 by way of example on one side, at the second end side 420 facing the first housing cover 150, protrudes beyond the bearing ring 310, whereas the intermediate ring 305 and the bearing ring 310 are disposed flush with the first end side 415 facing the cover portion 165.

The lubrication duct system 266 can comprise at least one lubrication supply duct 425 for a lubricant infeed of the lubricant. The lubrication supply duct 425 can be designed so as to at least partially run in the manner of a groove in the circumferential direction radially outside on the bearing ring 310. Radially outside, the lubrication supply duct 425 is closed by the intermediate ring 305. In addition, the lubrication duct system 266 can have at least one lubrication passage duct, preferably a plurality of lubrication passage ducts 430, which are disposed so as to be mutually offset in the circumferential direction and run in the radial direction. The lubrication passage duct 430 ends radially inside, in a radial gap between the first raceway 295 and the second raceway 300, in which the rolling element assembly 275 is disposed. The lubrication duct system 266 is fluidically connected to a lubricant supply not illustrated. A lubricant, which is, for example, oil-based or grease-based, for lubricating the rolling element assembly 275 of the rolling element assembly 275 is supplied from the outside by means of the lubrication duct system 266.

It is particularly advantageous for the securing means 265 to be designed to be, for example, tubular, and to enclose a lubrication supply duct 445 on the inside. The lubrication supply duct 445 opens out on the inside of the lubrication duct system 266, in particular at the lubrication supply duct 425. The lubricant can be supplied in a simple manner from the outside via the lubrication supply duct 445. Furthermore, the sealant 406 avoids mixing of the coolant with the lubricant and vice versa.

Figures 6, 7, 8, 9:
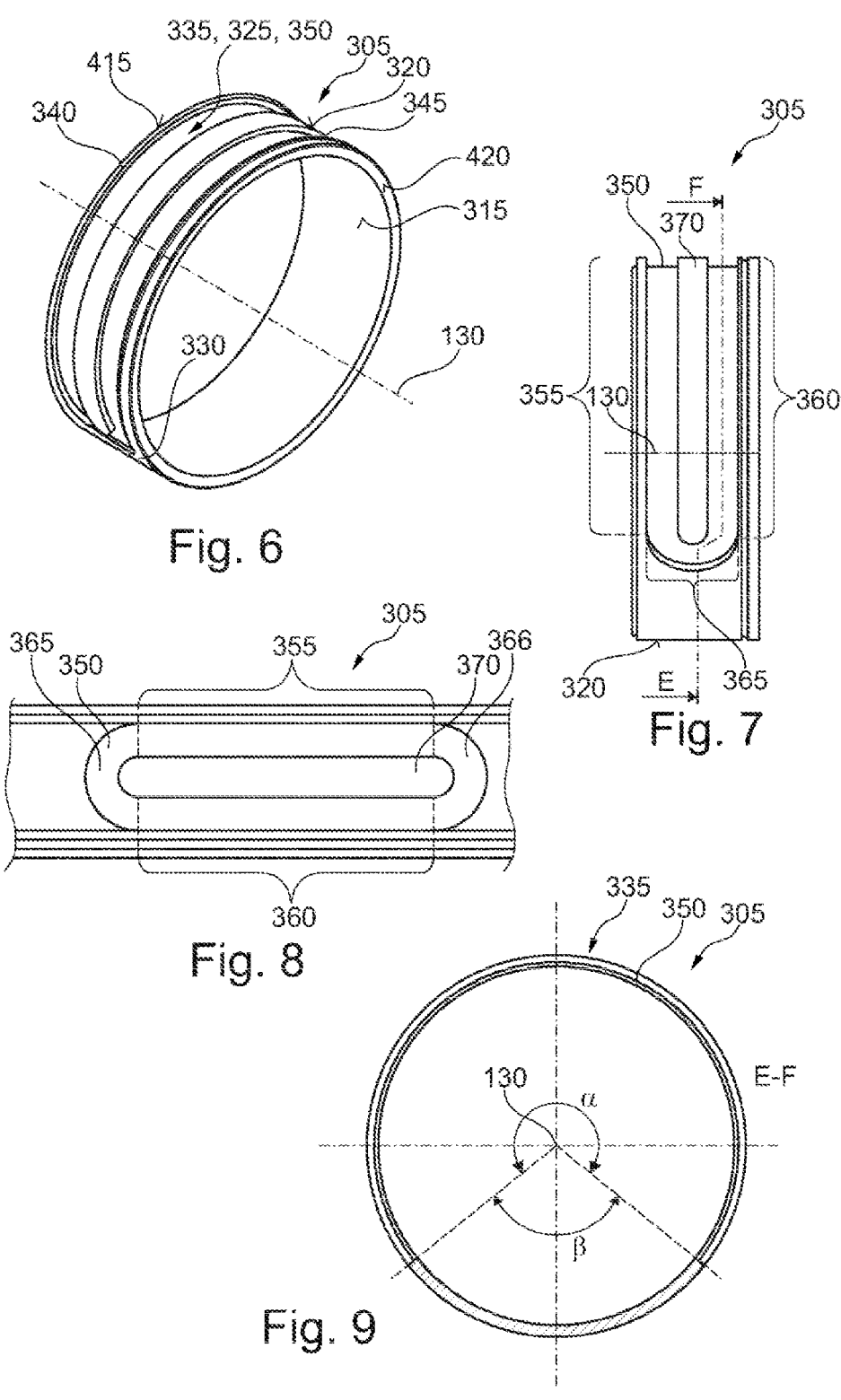
FIG. 6 shows a perspective illustration of an intermediate ring of the pedestal bearing shown in FIGS. 3 and 4.
FIG. 7 shows a lateral view of the intermediate ring shown in FIG. 6.
FIG. 8 shows a developed view of the intermediate ring shown in FIGS. 6 and 7.
FIG. 9 shows a sectional view along a section E-F, shown in FIG. 7, of the intermediate ring shown in FIG. 7.

FIG. 6 shows a perspective illustration of the intermediate ring 305.

A fifth inner circumferential side 315 of the intermediate ring 305 is designed to be substantially uninterrupted, and runs in a cylindrical manner about the rotation axis 130. A second outer circumferential side 320 of the rolling bearing outer race 280, by way of example of the intermediate ring 305 in FIG. 6, is divided into a cooling region 335 and a supporting region 330. The bearing force F is transmitted to the first inner circumferential side 170 of the bearing receptacle 175 via the second outer circumferential side 320.

The cooling duct system 261 has a cooling duct 325 which is disposed in the cooling region 335. In the cooling region 335, a groove channel 350 for forming the cooling duct 325 of the cooling duct system 261 is disposed on the second outer circumferential side 320. The groove channel 350 is disposed between a first sealing groove 340 and a second sealing groove 345, so as to be spaced apart in the axial direction. The first sealing groove 340 and the second sealing groove 345 are formed on the second outer circumferential side 320 so as to completely encircle the rotation axis 130. For example, the first sealing groove 340 is designed to be open toward the first end side 415 of the intermediate ring 305, whereas the second sealing groove 345 is disposed so as to be spaced apart from that second end side 420 of the intermediate ring 305 that is disposed opposite the first end side 415.

FIG. 7 shows a lateral view of the intermediate ring 305 shown in FIG. 6.

The groove channel 350 is radially open toward the outside. The intermediate ring 305 is preferably designed in such a way that the groove channel 350 does not protrude up to the fifth inner circumferential side 315, but is radially inwardly closed toward the rotation axis 130 by the material of the intermediate ring 305 of the groove channel 350.

The groove channel 350 has at least one first groove channel portion 355, one second groove channel portion 360, and at least one third groove channel portion 365. Additionally, the groove channel 350 can have a fourth groove channel portion 366 which is obscured in FIG. 7. The first groove channel portion 355 and the second groove channel portion 360 are disposed so as to be mutually spaced apart in the axial direction, wherein a web 370 extends radially outward between the first groove channel portion 355 and the second groove channel portion 360. The web 370, for example, has approximately the same axial width as the first groove channel portion 355 and/or the second groove channel portion 360.

FIG. 8 shows a section of a developed view of the intermediate ring 305 shown in FIGS. 6 and 7.

The first groove channel portion 355 and the second groove channel portion 360 are connected to one other in a first end region via the third groove channel portion 365. The third groove channel portion 365 here is designed in an arcuate manner and delimits the web 370 in the circumferential direction.

The first groove channel portion 355 and the second groove channel portion 360 are connected to one other in a second end region, opposite the first end region in the circumferential direction, via the fourth groove channel portion 366. The fourth groove channel portion 366 is preferably designed in an arcuate manner and delimits the web 370 in the circumferential direction opposite the third groove channel portion 365. As a result, the groove channel 350 in the developed view has the shape of a flat pressed ring. Alternatively, for example, the groove channel 350 could be routed so as to meander between the first sealing groove 340 and the second sealing groove 345.

FIG. 9 shows a sectional view along a section E-F, shown in FIG. 7, of the intermediate ring 305 shown in FIG. 7.

The groove channel 350 and thus the cooling region 335 extend over a first angular segment a in terms of the rotation axis 130. The supporting region 330 in terms of the rotation axis 130 extends over a second angular segment B and is designed so as to run in a partially cylindrical manner about the rotation axis 130. Preferably, interruptions by notches or grooves in the supporting region 330 of the second outer circumferential side 320 are dispensed with. The first angular segment a includes an angle of at least 180°, preferably 230° up to and including 300°. The second angular segment B complements the first angular segment a to 360° and adjoins the respective ends of the cooling region 335 in the circumferential direction.

Figure 10:
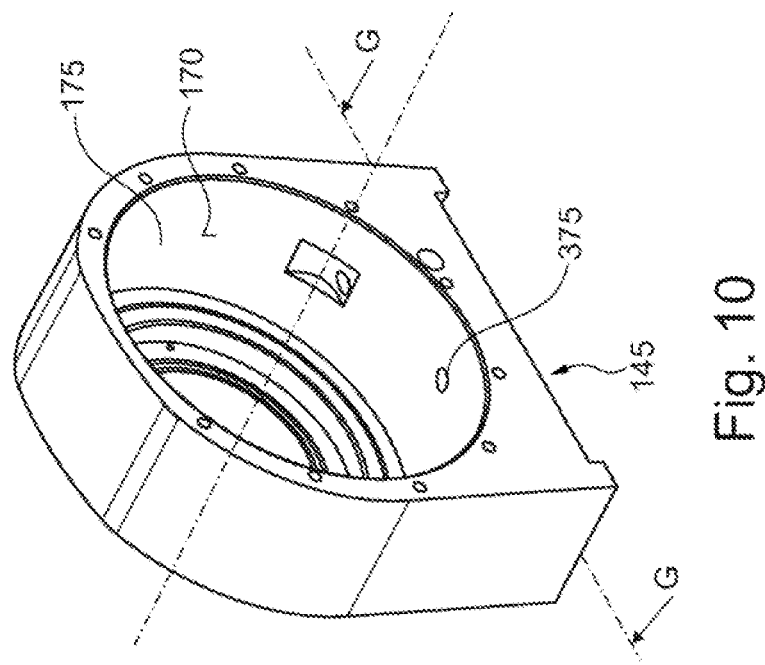
FIG. 10 shows a perspective illustration of a pedestal bearing housing of the pedestal bearing.

FIG. 10 shows a perspective view of the pedestal bearing housing 145.

On the side facing the fastening side 140 of the bearing receptacle 175, the pedestal bearing housing 145 has a first through-opening 375 which extends in the radial direction toward the rotation axis 130, wherein the first through-opening 375 opens out on the first inner circumferential side 170 of the bearing receptacle 175. The first through-opening 375 can be disposed, for example, in the axial direction in an approximately central position in relation to a maximum extent in the axial direction of the bearing receptacle 175.

Figure 11:
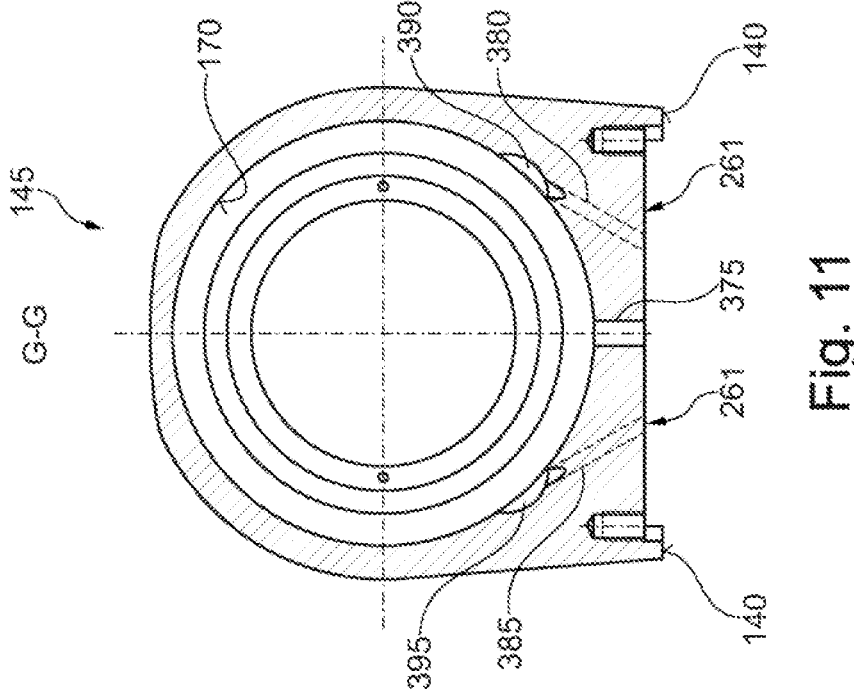
FIG. 11 shows a sectional view along a section plane G-G, shown in FIG. 10, through the pedestal bearing housing shown in FIG. 10.

FIG. 11 shows a sectional view along a section plane G-G, shown in FIG. 10, through the pedestal bearing housing 145 shown in FIG. 10.

In the pedestal bearing housing 145, by way of example, a feed duct 380 and a return duct 385 of the cooling duct system 261 are in each case disposed on the side facing the fastening side 140, wherein the feed duct 380 and the return duct 385 are disposed so as to be mutually spaced apart in the circumferential direction. In the circumferential direction, the first through-opening 375 can be disposed between the feed duct 380 and the return duct 385. The feed duct 380 can be fluidically connected to a coolant supply, and the return duct 385 can be fluidically connected to a coolant recirculation, of a cooling system of the production plant 10.

The feed duct 380 extends in a radial direction toward the outside. The feed duct 380 and the return duct 385, by way of example, are disposed obliquely in the pedestal bearing housing 145, wherein the feed duct 380 and the return duct 385 extend away from one other in the axial direction, in different axial directions A1, A2. By way of example, the feed duct 380 thus extends in the second axial direction A2, in the direction of the first housing cover 150, and the return duct 385 extends in the first axial direction, in the direction of the cover portion 165.

On the first inner circumferential side 170, the feed duct 38 opens out at a first mouth region 390, and the return duct 385 opens out at a second mouth region 395, for example. The first and second mouth region 390, 395 are in each case designed to be wider in the axial direction and radial direction than the feed duct 380, or the return duct 385, opening out at the mouth region 390, 395, respectively.

Figures 12A, 12B, 13A, 13B, 13C:
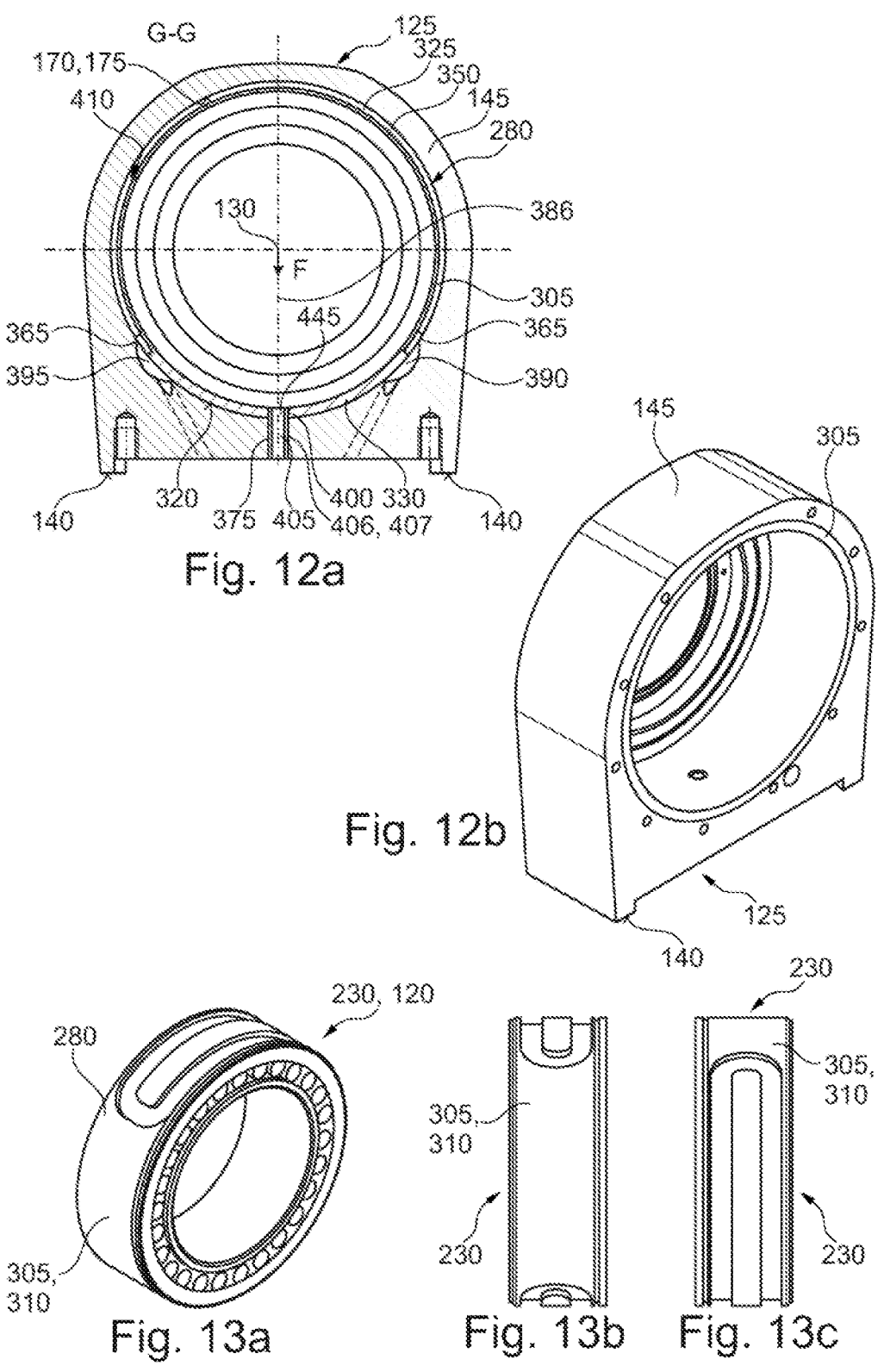

FIG. 12a shows a sectional view along the section plane G-G, shown in FIG. 10, through the pedestal bearing 125 in a partially assembled state. FIG. 12b shows a perspective illustration of the pedestal bearing 125 shown in FIG. 12a.

In FIGS. 12a, 12b, the intermediate ring 305 is inserted into the pedestal bearing housing 145. The intermediate ring 305 has a defined alignment in relation to the pedestal bearing housing 145. In this instance, for example, the supporting region 330 is aligned in the circumferential direction on the side facing the fastening side 140. It is particularly advantageous in this context, for the supporting region 330 to extend substantially completely in the circumferential direction between the first mouth region 390 and the second mouth region 395. Also, a different defined alignment of the intermediate ring 305 in relation to the pedestal bearing housing 145 is possible, depending on the load acting on the intermediate ring 305 by the bearing force F. In this case, the supporting region 330 is preferably disposed in the circumferential direction in such a manner that a straight line 386, which overlaps a direction of the bearing force F and intersects the rotation axis 130, runs through the supporting region 330. Preferably, the supporting region 330 is disposed on both sides of the straight line 386, preferably so as to be centric thereto. The straight line 386 can be aligned perpendicularly to the fastening region 140, or be inclined thereto preferably at an angle of 80° to 110°. It is advantageous for the bearing force F to be transmitted substantially via the supporting region 330 to the first inner circumferential side 170 of the bearing receptacle 175.

For example, a second through-opening 400, which extends completely through the intermediate ring 305, can be disposed in the intermediate ring 305, for example in the supporting region 330 or in the web 370. The first through-opening 375 and the second through-opening 400 herein are co-aligned. In FIG. 12a, for example, the second through-opening 400 is disposed in the circumferential direction in a centric position in relation to a maximum extent of the supporting region 330, and thus between the respective ends of the groove channel 350.

On account of the co-alignment of the first and second through-opening 375, 400, the first mouth region 390 is disposed in a radially outwardly overlapping manner in relation to the third groove channel portion 365, and the second mouth region 395 is disposed in the circumferential direction opposite the fourth groove channel portion 366 in a radially overlapping manner.

The securing means 265 is designed to be elongate, for example cylindrical. In the assembled state of the pedestal bearing housing 145 (cf. FIG. 5), the securing means 265 is disposed in the first and the second through-opening 375, 400. The securing means 265 establishes the defined alignment of the intermediate ring 305 relative to the pedestal bearing housing 145, on the one hand, and the securing means 265 connects the intermediate ring 305 to the pedestal bearing housing 145 in a rotationally fixed manner, on the other hand. For example, the securing means 265 can be fastened in the first and the second through-opening 400, 405 in a materially integral and/or form-fitting and/or force-fitting manner. In this way, an adhesive layer 406 which circumferentially encloses the securing means 265 can be provided, for example. The adhesive layer 406 herein additionally forms a sealant 407. The adhesive layer 406 has the advantage that a tightness on the securing means 265 relative to the cooling duct system 261 is ensured at the securing means 265.

In the installed state of the intermediate ring 305, the cooling duct 325 is radially outwardly delimited by the first inner circumferential side 170 of the bearing receptacle 175. The cooling duct 325 (cf. FIG. 5) is sealed by the fifth sealing element 255 disposed in the first sealing groove 340, and axially opposite the fifth sealing element 255 is sealed by the sixth sealing element 260 disposed in the second sealing groove 345. The fifth and the sixth sealing element 340, 345 rest in each case in a sealing manner against the intermediate ring 305 and the inner circumferential side 170.

In order to ensure positive rolling of the rolling element 290 on the raceways 295, 300 and low wear on the rolling element assembly 275, the oil-based or grease-based lubricant can be disposed at least in the region of the two raceways 295, 300. As a result of the sealing on both sides by means of the first to fourth sealing element 235, 240, 245, 250, mixing of the lubricant with cooling water for cooling the slab strand 85 is avoided.

A coolant 410, for example cooling water, is supplied via the feed duct 380 in order to cool the rolling bearing 230. The coolant 410 is provided by the cooling system. The coolant 410 flows into the feed duct 380, and flows along the feed duct 380 to the first mouth region 390. The coolant 410 flows from the first mouth region 390 into the third groove channel portion 365. The third groove channel portion 365 herein serves as a distributor, and distributes the supplied coolant 410 on the first groove channel portion 360 and the second groove channel portion 365. The coolant 410 flows in the circumferential direction along the first and the second groove channel portion 355, 360, until it has arrived in the circumferential direction at the other end of the first and the second groove channel portion 355, 360. For example, the fourth groove channel portion 366 serves as a junction and merges the two flows of coolant 410. The coolant 410 flows from the fourth groove channel portion 366 into the second mouth region 395, and from there the coolant 410 is discharged via the return duct 385 from the pedestal bearing 125 into a return flow of the cooling system. The coolant 410 absorbs heat in the pedestal bearing 125 and cools the pedestal bearing 125. In particular, the rolling bearing 230 is well cooled and protected against overheating in the process, particularly by the radially inner cooling duct 325.

The sealing of the cooling duct 325 by the fifth and sixth sealing element 255, 260 in the first and the second sealing groove 340, 345 prevents the coolant 410 from escaping from the bearing receptacle 175 in the direction of the rolling element assembly 275, and a mixing of the coolant 410 with the lubricant. This ensures reliable cooling of the rolling bearing 230 on the one hand, and also prevents corrosion or loss of lubrication of the rolling bearing 230, in particular of the rolling element assembly 275 on the other hand. This ensures a long service life of the rolling bearing 230 even at the hot ambient temperatures at which the pedestal bearing 125 is used for mounting the roller 120. In particular, a degeneration of the lubricant is prevented by the positive cooling by means of the further coolant 410. This means that support for the bearing force F can be ensured even at ambient temperatures of 5° C. to 600° C. for the pedestal bearing 125, and at a low rotating speed of the roller 120 from 0.5 revolutions per minute to 10 revolutions per minute.

The defined alignment of the supporting region 330 in relation to the bearing force F ensures reliable support for the bearing force F from the roller 120 via the rolling bearing 230, in particular via the intermediate ring 305 to the first inner circumferential side 170 of the pedestal bearing housing 145. Owing to the fact that the disposal of the cooling duct 325 in the supporting region 330 is dispensed with, a surface pressure on the second outer circumferential side 320 in the supporting region 330, and on the supporting region 330 resting against the first inner circumferential side 170, can be minimized. This prevents mechanical overload of the web 370 by the bearing force F. The bearing force F is transmitted from the pedestal bearing housing 145 directly—bypassing the first housing cover 150—to the first contact face 146, and is supported via the first contact face 146 on the second contact face 147 on the segment frame 135.

Furthermore, the intermediate ring 305 can be produced, for example, as a turned part and the groove channel 350 can be milled into the second outer circumferential side 320, so that the intermediate ring 305 can be produced in a particularly simple and cost-effective manner. In conjunction with the bearing ring 310, the intermediate ring 305 can form the rolling bearing outer race 280 in a simple manner. This means that complex machining of the bearing ring 310, which is hardened at least on the first bearing surface 295, can be dispensed with. Furthermore, the assembly of the rolling bearing 230, and the defined alignment of the rolling bearing 230 in relation to the pedestal bearing housing 145, are particularly simple.

FIG. 13a shows a perspective illustration of the rolling bearing 230 of a pedestal bearing 125 according to a second embodiment. FIG. 13b and FIG. 13c each show a lateral view of the rolling bearing 230 shown in FIG. 13a from different directions.

For reasons of clarity, the illustration of the pedestal bearing housing 145 is dispensed with in FIGS. 13a to 13c.

The pedestal bearing 125 is designed to be substantially identical to the pedestal bearing 125 according to the first embodiment described in FIGS. 1 to 12. In the following, only the differences of the pedestal bearing 125 according to the second embodiment, shown in FIGS. 13a to 13c, in comparison to the pedestal bearing 125 according to the first embodiment, shown in FIGS. 1 to 12, are discussed. The rolling bearing 230 shown in FIGS. 13a to 13c has a rolling bearing outer race 280 which is designed in one piece and in a materially integral manner. The bearing ring 310 and the intermediate ring 305 are formed conjointly FIG. 14 shows a longitudinal section through the rolling bearing 230 shown in FIGS. 13a to 13c.

Due to the one-piece and material-integral design of the bearing ring 310 and the intermediate ring 305, the rolling bearing outer race 280 is designed with a particularly thin wall in the radial direction, so that the pedestal bearing 125 can be designed to be particularly compact in the radial direction. Furthermore, the thin-walled design leads to the cooling duct 325 being routed particularly close to the rolling element assembly 275 and thus close to the lubricant. As a result, both the lubricant and the rolling element assembly 275 can be cooled particularly well by means of the coolant 410.

Figures 14, 15:
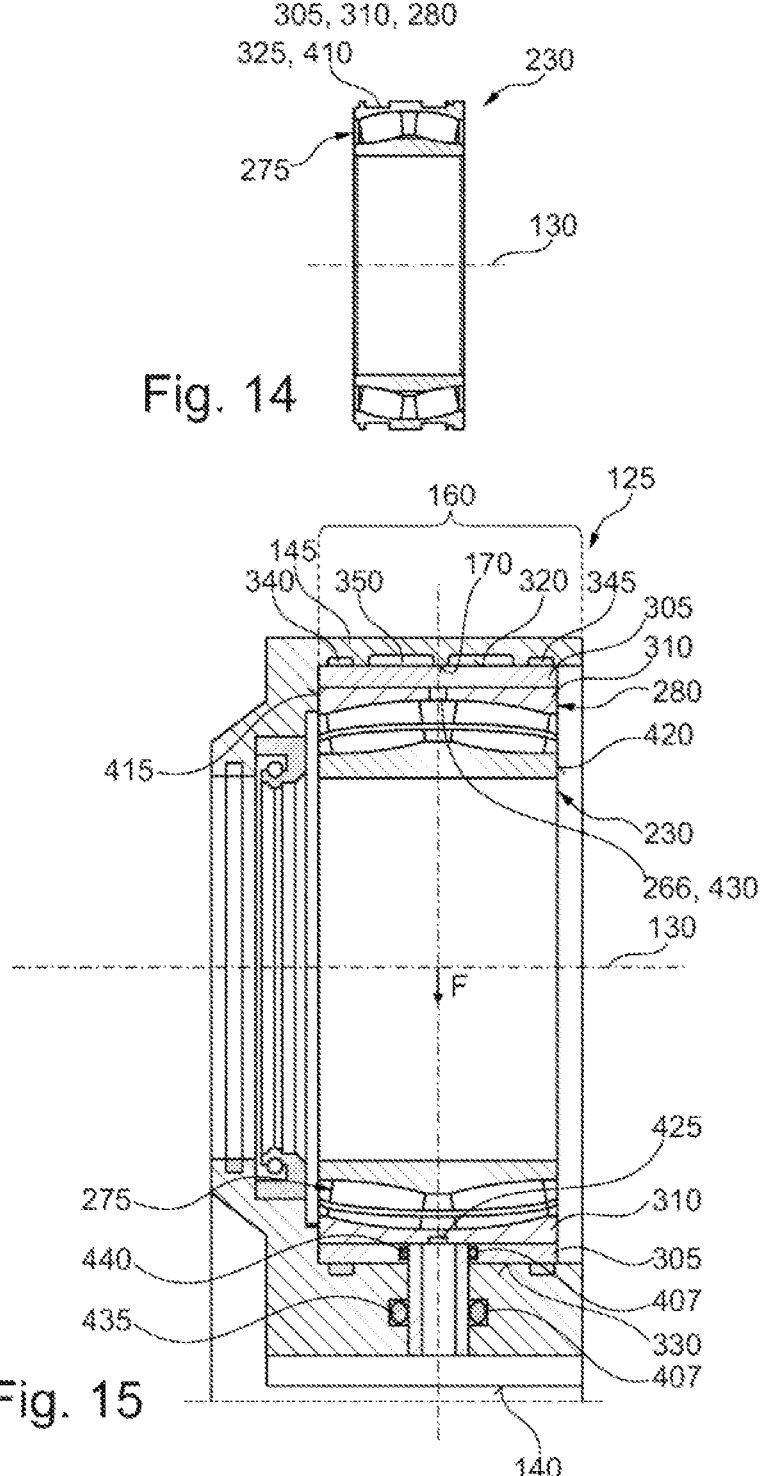
FIG. 14 shows a longitudinal section through the rolling bearing shown in FIG. 13.
FIG. 15 shows a sectional view along the section line C-D, shown in FIG. 4, through a pedestal bearing according to a third embodiment.

FIG. 15 shows a sectional view along the section line C-D, shown in FIG. 4, through a pedestal bearing 125 according to a third embodiment.

The pedestal bearing 125 is designed to be substantially identical to the design of the pedestal bearing 125 according to the first embodiment shown in FIGS. 1 to 12. In the following, only the differences of the pedestal bearing 125 according to the third embodiment, shown in FIG. 15, in comparison to the pedestal bearing 125 according to the first embodiment, shown in FIGS. 1 to 12, are discussed. For reasons of clarity, the roller 120 and the first housing cover 150 are not illustrated in FIG. 15.

Deviating from the first embodiment shown in FIGS. 1 to 12, the second end side 420 is designed to be substantially planar instead of the stepped configuration shown in FIGS. 1 to 12, so that the bearing ring 310 and the intermediate ring 305 terminate flush with the second end side 420.

In the embodiment in FIG. 15, the intermediate ring 305 is of an annular design, wherein the second outer circumferential side 320 is formed substantially without interruptions. In the embodiment shown in FIG. 15, the groove channel 350 is disposed on the first inner circumferential side 170 of the pedestal bearing housing 145 in the bearing portion 160. Deviating therefrom, the groove channel 350 is designed to be radially inwardly open on the pedestal bearing housing 145. The cooling duct 325 here is radially delimited on the inside by the second outer circumferential side 320 of the rolling bearing outer race 280, which is formed in a substantially cylindrical manner in the embodiment.

The groove channel 350 can be milled into the pedestal bearing housing 145, for example. The disposal of the groove channel 350 has the advantage that it can be assembled freely oriented in the circumferential direction while assembling the rolling bearing 230 in the bearing receptacle 175. This facilitates the assembling of the pedestal bearing 125.

In the embodiment in FIG. 15, the rolling bearing outer race 280 is designed in two parts, i.e. by the intermediate ring 305 and the bearing ring 310, as shown in FIG. 5. Of course, the rolling bearing outer race 280 can also be designed in one piece and in a materially integral manner.

Deviating from the design embodiment shown in FIGS. 1 to 12, the first sealing groove 340 and the second sealing groove 345 are furthermore disposed in the bearing portion 160. The sealing groove 340, 345 is open radially inwardly toward the rolling bearing 230. As a result, the fifth and sixth sealing element 255, 260 in the respective sealing groove 340, 345, rest against the latter, but also against the second outer circumferential side 320 of the intermediate ring 305.

Likewise, as shown in FIG. 15, the groove channel 350 is routed substantially on the side facing away from the fastening side 140 of the bearing receptacle 175, so that the intermediate ring 205 in the supporting region 330 rests against the second outer circumferential side 320 and against the first inner circumferential side 170 of the bearing receptacle 175 across substantially the full area, so as to particularly well support the bearing force F and transmit the latter in each case from the rolling bearing 230 via the pedestal bearing housing 145 to the fastening side 140. On the fastening side 140, the bearing force F is supported on the segment frame 135.

It is pointed out that the pedestal bearing housing 145 shown in FIG. 15 with the groove channel 350, can also be combined with the rolling bearing 230 shown in FIGS. 6 to 14. In this case, the alignment and design embodiment of the respective groove channel 350, which is disposed in both the second outer circumferential side 230 of the rolling bearing 230 and in the first inner circumferential side 170 of the bearing receptacle 175, is complementary so that the two groove channels 350 form the cooling duct 325. In this design embodiment, the sealing groove 340, 345 can be disposed either in the rolling bearing 230 as shown in FIGS. 6 to 14, or in the pedestal bearing housing 145, as shown in FIG. 15, in order to seal the cooling duct 325.

If the groove channel 350 is disposed both in the rolling bearing 230 and in the pedestal bearing housing 145, the cooling duct 325 has a particularly large cross-sectional area, so that particularly positive cooling of the rolling bearing 230, in particular of the lubricant of the rolling bearing 230, is ensured. Furthermore, the radial structure is particularly slim and compact.

Deviating from FIGS. 3 to 12, the securing means 265 is screwed into the pedestal bearing housing 145, for example. By way of example, the sealant 407 can be formed from an assembly of sealing rings that enclose the securing means 265. For example, the sealing ring can be designed as an O-ring. In this instance, a sealing ring is disposed in the pedestal bearing housing 145 and in the rolling bearing outer race 280 in a third and fourth sealing groove 435, 440 at the respective through-opening 375, 400.

Furthermore, instead of the design embodiment shown in FIGS. 5 to 15, the cover portion 165 may be designed as a separate second housing cover, which, like the first housing cover 150, is fastened to the pedestal bearing housing 145, in particular to the bearing portion 160, in a reversibly detachable manner, for example by means of a threaded connection, axially opposite the first housing cover 150.

The design embodiment of the pedestal bearing 125 shown in FIGS. 1 to 15 is particularly easy to manufacture in a few production steps and provides a high operational strength even under high thermal load, In particular in the continuous casting machine 20 and/or the pre-rolling train 25 and/or the intermediate heater 45 and/or the descaler 50 and/or the finishing rolling train 55 and/or the roller table 100.

LIST OF REFERENCE SIGNS

10 Production plant
15 Hot-rolled material
20 Continuous casting machine
25 Pre-rolling train
30 First separating device
35 Second separating device
40 Third separating device
45 Intermediate heater
50 Descaler
55 Finishing rolling train
60 Cooling section
65 Coiling device
70 Ladle
71 Distributor
75 Mold
80 Metallic melt
85 Slab strand
90 Strand guide
95 Pre-rolled strip
100 Roller table
105 Finish-rolled strip
110 Coil
115 Driving stand
120 Roll
121 Rolling surface
125 Pedestal bearing
130 Rotation axis
135 Segment frame
140 Fastening side
145 Pedestal bearing housing
146 First contact face
147 Second contact face
150 First housing cover
160 Bearing portion
165 Cover portion
170 First inner circumferential side
175 Bearing receptacle
180 First shoulder face
185 Shoulder
190 Second inner circumferential side
195 First seal receptacle
200 Second seal receptacle
205 Symmetry plane
210 Third seal receptacle
215 Fourth seal receptacle
216 Third inner circumferential side
220 Second shoulder face
225 Third shoulder face
229 First outer circumferential side
230 Rolling bearing
235 First sealing element
240 Second sealing element
245 Third sealing element
250 Fourth sealing element
255 Fifth sealing element
260 Sixth sealing element
261 Cooling duct system
265 Securing means

US 12,698,804 B2

17

266 Lubrication duct system
270 Rolling bearing inner race
275 Rolling element assembly
280 Rolling bearing outer race
285 Fourth inner circumferential side
286 Bearing portion
290 Rolling elements
295 First raceway
300 Second raceway
305 Intermediate ring
310 Bearing ring
315 Fifth inner circumferential side
320 Second outer circumferential side
325 Cooling duct
330 Supporting region
335 Cooling region
340 First sealing groove
345 Second sealing groove
350 Groove channel
355 First groove channel portion
360 Second groove channel portion
365 Third groove channel portion
366 Fourth groove channel portion
370 Web
375 First through-opening
380 Feed duct
385 Return duct
390 First mouth region
395 Second mouth region
400 Second through-opening
405 Screw
406 Adhesive layer
407 Sealant
410 Coolant
415 First end side
420 Second end side
425 Lubrication supply duct
430 Lubrication passage duct
435 Third sealing groove
440 Fourth sealing groove
α First angle segment
β Second angle segment
A1 First axial direction
A2 Second axial direction
F Bearing force

The invention claimed is:

1. A pedestal bearing for bearing a running body in a production plant for producing a hot-rolled material, having
a pedestal bearing housing having a bearing receptacle,
a cooling duct system with at least one cooling duct that includes a groove channel,
a rolling bearing which is disposed in the bearing receptacle and has a rolling bearing outer race,
the groove channel being on a first inner circumferential side of the bearing receptacle encircling the rotation axis, and
a web surrounded by the groove channel,
wherein the pedestal bearing housing has a first contact face,
wherein the pedestal bearing housing is designed to transfer a bearing force (F) from the rolling bearing outer race to the first contact face,
wherein the cooling duct extends in the circumferential direction about the rotation axis and is designed to guide a coolant which is able to be fed into the cooling duct for cooling the rolling bearing and/or the pedestal bearing housing,

wherein the first inner circumferential side of the bearing receptacle of the pedestal bearing housing delimits the cooling duct radially outside, and the rolling bearing outer race delimits the cooling duct radially inside,
wherein the groove channel has a first groove channel portion and a second groove channel portion fluidically connected to the first groove channel portion,
wherein the first groove channel portion extends in the circumferential direction about the rotation axis,
wherein the second groove channel portion extends in the circumferential direction about the rotation axis so as to be axially offset from the first groove channel portion by the web,
wherein the groove channel has a third groove channel portion,
wherein the groove channel has a fourth groove channel portion,
wherein the third groove channel portion connects a circumferential end of the first groove channel portion to a circumferential end of the second groove channel portion,
wherein the fourth groove channel portion connects another circumferential end of the first groove channel portion that is opposite to the circumferential end thereof to another circumferential end of the second groove channel portion that is opposite to the circumferential end thereof.

2. The pedestal bearing as claimed in claim 1,
wherein the groove channel extends at least in portions and is designed to be groove-shaped in the circumferential direction,
wherein the groove channel is designed to be radially outwardly open, and radially inwardly delimits the cooling duct.

3. The pedestal bearing as claimed in claim 2, wherein the groove channel is at least in portions designed to be annular between a first end side of the rolling bearing outer race and a second end side of the rolling bearing outer race that is opposite in the axial direction.

4. The pedestal bearing as claimed in claim 2,
wherein the web rests against the first inner circumferential side of the bearing receptacle.

5. The pedestal bearing as claimed in claim 4,
wherein the first groove channel portion extends in the circumferential direction parallel to the second groove channel portion.

6. The pedestal bearing as claimed in claim 2,
wherein the rolling bearing outer race has an intermediate ring and a bearing ring,
wherein the intermediate ring is formed so as to be hollow-cylindrical about the rotation axis and radially inside has a fifth inner circumferential side and radially outside has the second outer circumferential side,
wherein the bearing ring is disposed radially inside the intermediate ring and radially outside rests against the fifth inner circumferential side of the intermediate ring.

7. The pedestal bearing as claimed in claim 6,
wherein the intermediate ring has the groove channel extending radially from the second outer circumferential side in the direction of the fifth inner circumferential side.

8. The pedestal bearing as claimed in claim 1,
wherein the groove channel is designed to be groove-shaped at least in portions and extends in the circumferential direction, wherein the groove channel is designed to be radially inwardly open, and radially outwardly delimits the cooling duct.

9. The pedestal bearing as claimed in claim 1, wherein the rolling bearing outer race is a one piece body and/or the pedestal bearing housing is a one piece body.

10. The pedestal bearing as claimed in claim 1, having at least one fifth sealing element and a first sealing groove disposed on the second outer circumferential side or on the first inner circumferential side, wherein the first sealing groove is designed to completely encircle the rotation axis, wherein the fifth sealing element is at least in portions disposed in the first sealing groove, wherein the fifth sealing element is designed to seal the cooling duct in a fluid-tight manner.

11. The pedestal bearing as claimed in claim 10, wherein the first sealing groove and the groove channel are formed on the first inner circumferential side or in the second outer circumferential side.

12. The pedestal bearing as claimed in claim 1, wherein the cooling duct system comprises a feed duct disposed in the pedestal bearing housing and a return duct disposed in the pedestal bearing housing, wherein the feed duct and the return duct each end in the cooling duct in a mutually offset manner, wherein the coolant is able to be fed into the cooling duct by means of the feed duct, wherein coolant is able to be discharged from the cooling duct by means of the return passage.

13. A production plant for producing and/or transporting hot-rolled material, having a pedestal bearing as claimed in claim 1, and the running body, the running body having a circumferentially disposed rolling surface for guiding, supporting and/or forming the hot-rolled material, wherein the rolling bearing supports the running body so as to be rotatable about the rotation axis.

14. The production plant as claimed in claim 13, wherein the production plant is a continuous casting plant and wherein the hot-rolled material is a hot-cast slab strand.

15. The pedestal bearing as claimed in claim 1, wherein the production plant is a continuous casting plant.

16. A pedestal bearing for bearing a running body in a production plant for producing a hot-rolled material, having a pedestal bearing housing having a bearing receptacle, a cooling duct system with at least one cooling duct, a rolling bearing which is disposed in the bearing receptacle and has a rolling bearing outer race, wherein the bearing receptacle has a first inner circumferential side encircling the rotation axis, wherein the pedestal bearing housing has a first contact face, wherein the pedestal bearing housing is designed to transfer a bearing force (F) from the rolling bearing outer race to the first contact face, wherein the cooling duct extends in the circumferential direction about the rotation axis and is designed to guide a coolant which is able to be fed into the cooling duct for cooling the rolling bearing and/or the pedestal bearing housing, wherein the first inner circumferential side of the bearing receptacle of the pedestal bearing housing delimits the cooling duct radially outside, and the rolling bearing outer race delimits the cooling duct radially inside, wherein a second outer circumferential side of the rolling bearing outer race is divided into a cooling region and a supporting region, wherein the cooling duct is disposed in the cooling region and does not extend into the supporting region, wherein the cooling duct extends over a predefined first angular segment (α) about the rotation axis on the second outer circumferential side, wherein the supporting region adjoins the cooling duct in the circumferential direction, wherein the supporting region extends substantially over a predefined second angular segment (β), wherein the second outer circumferential side in the supporting region is designed to be substantially partially cylindrical, wherein the first inner circumferential side and the second outer circumferential side in the supporting region rest against one another across an entire area, wherein the bearing force (F) is able to be transmitted predominantly via the supporting region to the pedestal bearing housing, wherein the bearing force (F) is directed so as to proceed from the rotation axis to the supporting region, and wherein the first angular segment (α) includes an angle in the range 140° up to and including 330°, about the rotation axis.

17. The pedestal bearing as claimed in claim 16, wherein the first angular segment (α) includes an angle in the range 180° to 300°, about the rotation axis.

* * * * *